(12) United States Patent
Afflitto

(10) Patent No.: US 11,992,387 B2
(45) Date of Patent: May 28, 2024

(54) ZYGOMATIC IMPLANT

(71) Applicant: Massimo Afflitto, Turin (IT)

(72) Inventor: Massimo Afflitto, Turin (IT)

( * ) Notice: Subject to any disclaimer, the term of this patent is extended or adjusted under 35 U.S.C. 154(b) by 0 days.

(21) Appl. No.: 17/518,465

(22) Filed: Nov. 3, 2021

(65) Prior Publication Data

US 2022/0192797 A1 Jun. 23, 2022

(30) Foreign Application Priority Data

Dec. 17, 2020 (IT) .................. 102020000031160

(51) Int. Cl.
*A61C 8/00* (2006.01)

(52) U.S. Cl.
CPC .......... *A61C 8/0034* (2013.01); *A61C 8/0028* (2013.01); *A61C 8/0068* (2013.01); *A61C 8/0095* (2013.01)

(58) Field of Classification Search
CPC ... A61C 8/0034; A61C 8/0068; A61C 8/0095; A61C 8/0048; A61C 8/005; A61C 8/0018; A61C 8/0037; A61C 8/0075; A61C 8/0093; A61C 8/0098; A61C 8/001; A61C 8/003; A61C 8/0031; A61C 8/0028; A61B 17/68; A61B 17/70; A61B 17/744; A61B 17/7291; A61B 17/72
USPC .................... 606/54, 59; 623/17.17
See application file for complete search history.

(56) References Cited

U.S. PATENT DOCUMENTS

| | | | | |
|---|---|---|---|---|
| 3,981,079 | A * | 9/1976 | Lenczycki | A61C 1/084 433/174 |
| 7,699,613 | B2 * | 4/2010 | Niznick | A61C 8/0069 433/174 |
| 10,292,793 | B2 * | 5/2019 | Blackbeard | A61C 8/0089 |
| 2009/0317763 | A1 | 12/2009 | Brajnovic | |
| 2016/0128834 | A1 * | 5/2016 | Yakir | A61F 2/2803 433/176 |
| 2017/0281320 | A1 | 10/2017 | Blackbeard et al. | |
| 2020/0008848 | A1 | 1/2020 | Hale | |

FOREIGN PATENT DOCUMENTS

EP  1448113 B1 * 12/2015 .......... A61C 8/0001

OTHER PUBLICATIONS

Italian Search Report and Written Opinion for IT Patent Application No. 2020000031160, dated Jul. 9, 2021, Munich, DE, 9 Pages.

* cited by examiner

*Primary Examiner* — Jan Christopher L Merene
*Assistant Examiner* — Luis Ruiz Martin
(74) *Attorney, Agent, or Firm* — Armstrong Teasdale LLP

(57) ABSTRACT

A zygomatic implant for supporting a dental bridge is provided. The zygomatic implant has a stem with a longitudinal axis having a threaded apical portion, an intermediate portion, and a neck portion having a seat for attachment of an abutment. The zygomatic implant has a head with a polygonal cross section that protrudes atop the neck portion, and two internal threads, each having an axis orthogonal to the longitudinal axis of the stem and a mouth located on a lateral wall of the stem. The two internal threads are arranged longitudinally offset along the longitudinal axis of the stem.

1 Claim, 7 Drawing Sheets

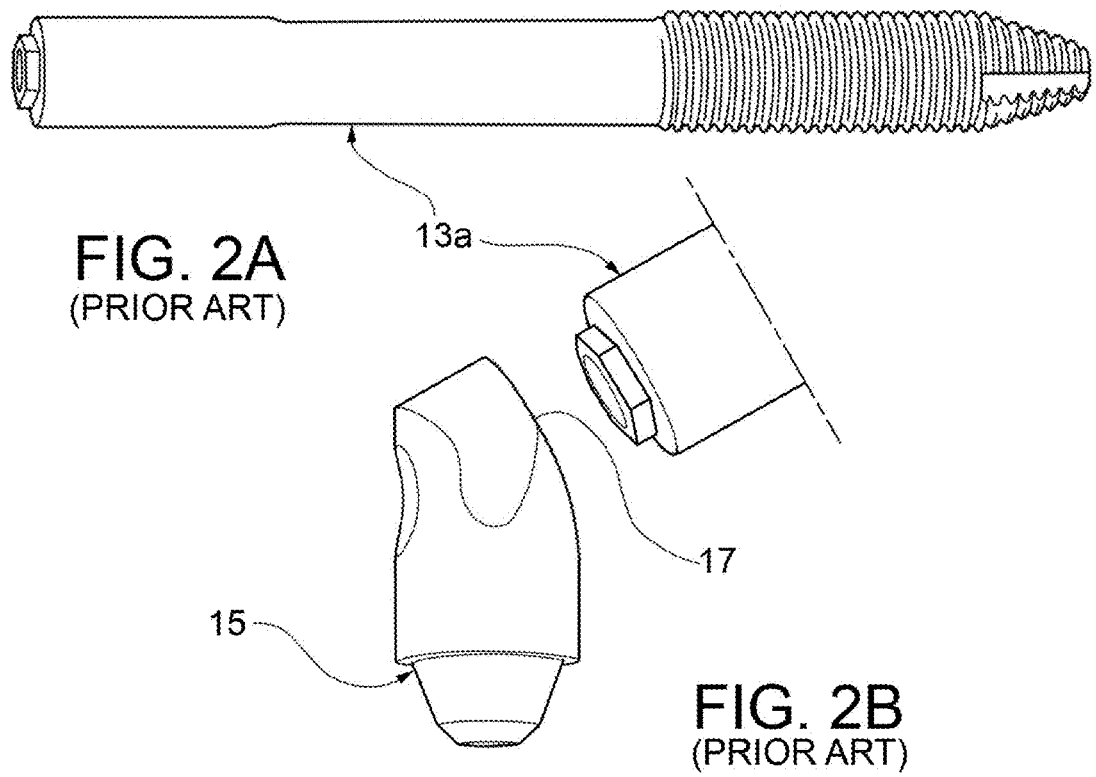
FIG. 2A (PRIOR ART)
FIG. 2B (PRIOR ART)
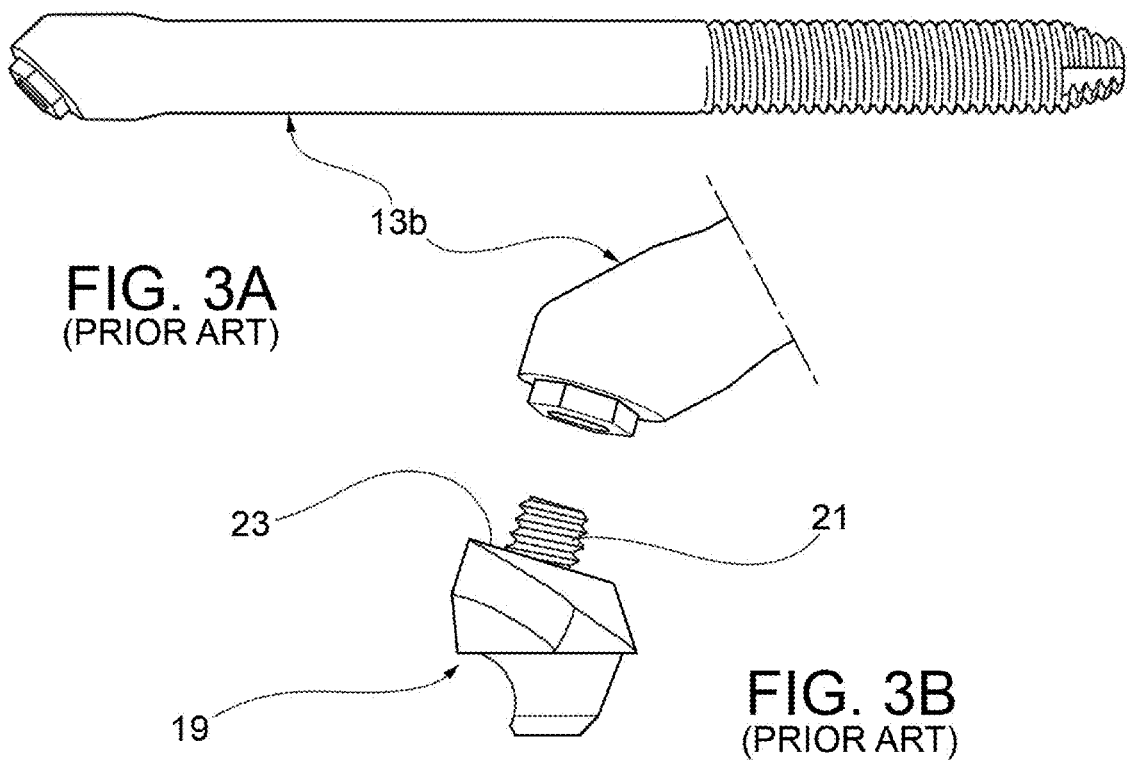
FIG. 3A (PRIOR ART)
FIG. 3B (PRIOR ART)

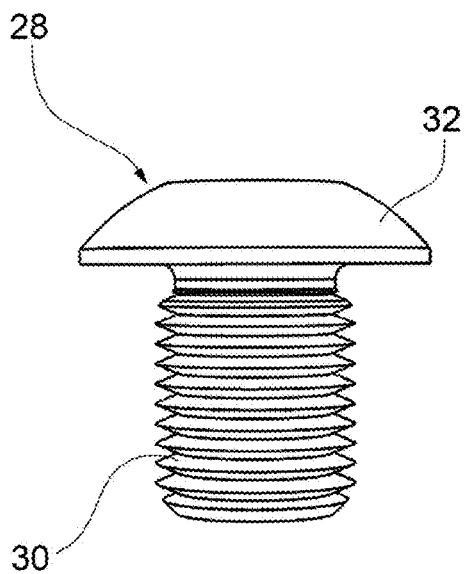
FIG. 6A
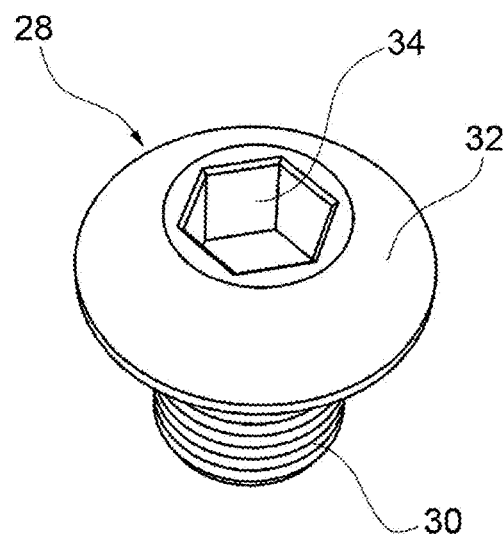
FIG. 6B
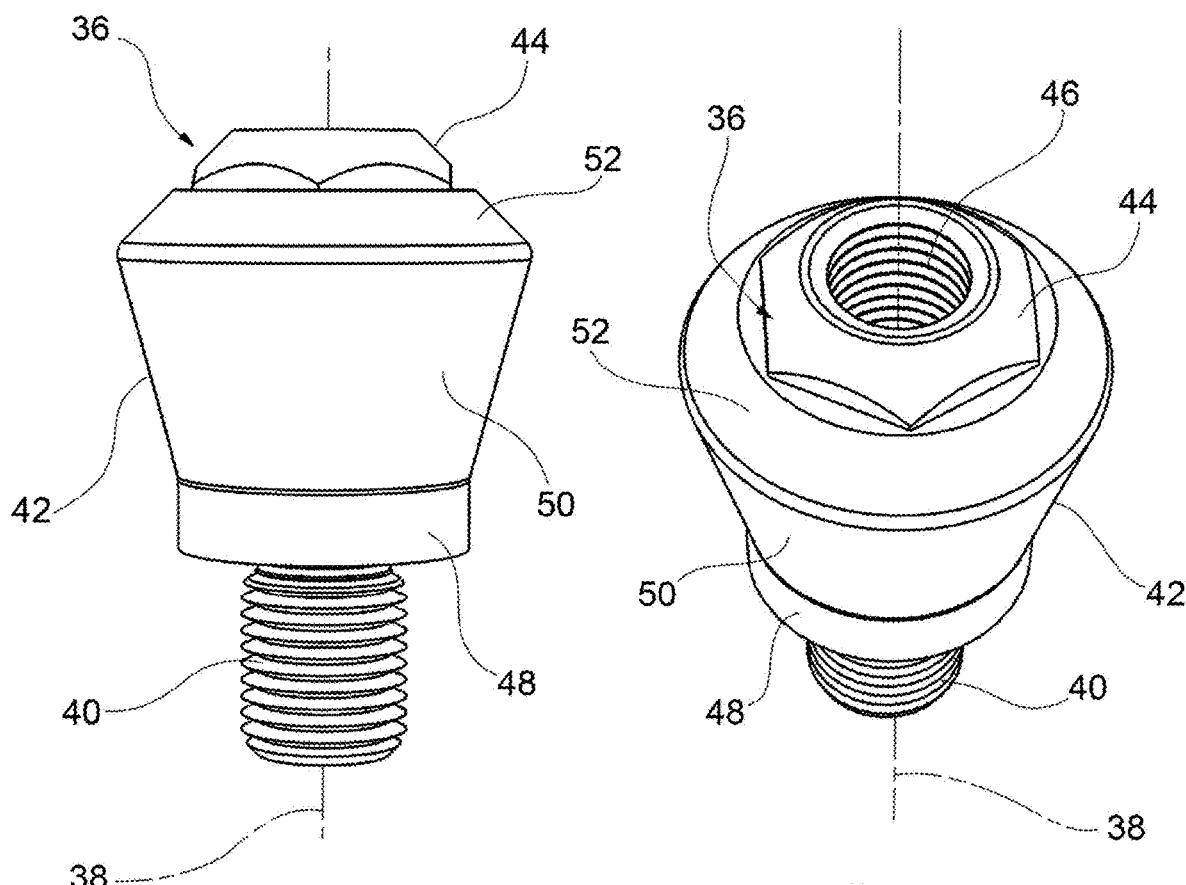
FIG. 7A
FIG. 7B

ZYGOMATIC IMPLANT

CROSS REFERENCE TO RELATED APPLICATION

This application claims priority to and benefit of Italian Patent Application No. 102020000031160 filed Dec. 17, 2020, the contents of which are incorporated by reference in their entirety.

FIELD OF THE INVENTION

The present invention relates to a zygomatic implant for supporting a dental bridge via interposed abutment.

BACKGROUND OF THE INVENTION

In partially or totally edentulous patients, the alveolar bone may be significantly resorbed, so that it may be impossible to anchor conventional dental implants in resorbed bone regions. To overcome this impossibility, elongated dental implants, called zygomatic implants, may be used in the upper jaw, which anchor in both the zygomatic bone and the residual alveolar bone, thus obtaining a double anchorage. It should be noted that the zygomatic implant extends laterally to the maxillary sinus between the alveolar bone and the zygomatic bone.

More specifically, a zygomatic implant comprises:
a stem having a longitudinal axis and having a threaded apical portion, an intermediate portion, and a neck portion having a seat for attachment of an abutment, and
a head with a polygonal cross section that protrudes atop the neck portion.

Usually, the assembly of the middle and neck portions of the stem is called the coronal portion.

Conventionally, the threaded apical portion is used for surgical placement in the zygomatic bone, while the coronal portion is used for surgical placement in the alveolar bone of the maxilla and to allow fixing the abutment, typically having a frustoconical shape, which serves as a support for a bridge that is screwed thereon.

Typical screwed bridge (FIG. 1A) calls for two conventional dental implants 11 placed vertically in the anterior maxilla and two tilted zygomatic implants 13. So-called screwed bridge can be made entirely of zirconia or have a framework of cobalt chrome overlaid by acrylic resin.

In detail, the frustoconical abutments are screwed onto the implants and only later the bridge is screwed onto the tapered abutments.

Typically, frustoconical (straight or angled) abutments are used to create a bridge associated with implants positioned "off-axis." In particular, zygomatic implants differ from conventional dental implants in that they are placed "off-axis in the frontal plane" at an angle, hereinafter referred to as the angle β, of approximately 50°-60°, and in particular 60°, whereby this offset angle (angle β) must be corrected with an angle on the whole of equal size and opposite to the abutment and/or implant stem seat in which the abutment is fixed.

The proper functioning of a zygomatic implant depends on its ability to resist the forces that tend to displace it during use. Specifically, it is the alveolar support that prevents displacement of the zygomatic implant caused by forces directed in the apical or oblique direction, and thus the movement of the zygomatic implant under occlusal loading. Thus, alveolar under-extension is likely to result in loss of anchorage, i.e., a zygomatic implant that may be easily displaced during use, whereas alveolar over-extension results in a double anchorage that is resistant to displacement but is likely to cause excessive palatal encumbrance for the tongue (FIG. 1B).

A first known type of zygomatic implant 13a (FIG. 2A) has a coronal end that allows (FIG. 2B) the connection of an angled frustoconical abutment 15 having a coupling surface 17 inclined at approximately 60° to compensate for the offset angle β at which the implant 13a will typically be placed.

A second known type of zygomatic implant 13b (FIG. 3A) has a coronal end (FIG. 3B) inclined approximately 45° and provided with an internal thread to allow the connection of an angled frustoconical abutment 19 having a threaded stem 21 and a coupling surface 23 inclined approximately 17° to compensate, together with the inclination of approximately 45° of the coronal end of the implant 13b, for the offset angle β at which said implant will typically be placed.

With both known implants described above, it may be difficult to achieve the desired double anchorage without causing excessive palatal encumbrance that is poorly tolerated by patients, as it is necessary to bridge the gap between the frustoconical abutment and the alveolar ridge of the maxilla.

Therefore, in conventional zygomatic implants, the respective frustoconical abutment is positioned at a distance from the alveolar ridge in the palatal direction, i.e., toward the interior of the oral cavity, as shown in FIG. 1B.

Conventional zygomatic implants thus result in three potential drawbacks. First, they may be both cumbersome and involve complications in mucosal healing. A second drawback associated with said implants is the high cantilever generated by frustoconical abutment, which is likely to cause excessive flexing under occlusal load. The third drawback is that they offer a single abutment connection option, not allowing for a more advantageous position of the abutment to be selected with respect to the screwed bridge.

SUMMARY OF THE INVENTION

An object of the present invention is therefore to overcome the drawbacks of the prior art mentioned above.

According to the present invention, this object is achieved by a zygomatic implant as described herein and comprising at least two internal threads, each having an axis orthogonal to the longitudinal axis of the stem and a mouth located on a side wall of the stem, the at least two internal threads being longitudinally arranged offset along the axis of the stem.

Preferred features of the implant of the invention are also described.

A further subject matter of the present invention is a kit comprising the zygomatic implant and at least one abutment with a rectilinear axis, having a threaded stem, a body, and a head within which an internal thread extending along said rectilinear axis is obtained.

The zygomatic implant of the present invention provides a reliable double anchorage, so as to ensure the stability of the anchorage of the coronal portion, with the abutment screwed into one of the internal threads, which nevertheless remains below the alveolar ridge. Advantageously, the cantilever generated by the abutment screwed into one of the internal threads of the zygomatic implant of the present invention is reduced, thereby decreasing flexing imparted to the implant, which by its nature is extra-long and therefore particularly sensitive to stresses of this nature.

BRIEF DESCRIPTION OF THE DRAWINGS

Further advantages and features of the present invention will become apparent from the following detailed description, given by way of non-limiting example with reference to the accompanying drawings, wherein:

FIG. 6A is an elevation view of a screwable cover in each of the internal threads in FIGS. 4 and 5, FIG. 6B is a perspective view of the cover screw in FIG. 6A, FIG. 7A is an elevation view of a screwable abutment in each of the internal threads in FIGS. 4 and 5, FIG. 7B is a perspective view of the straight frustoconical abutment in FIG. 7A.

DETAILED DESCRIPTION

Figure 1A:
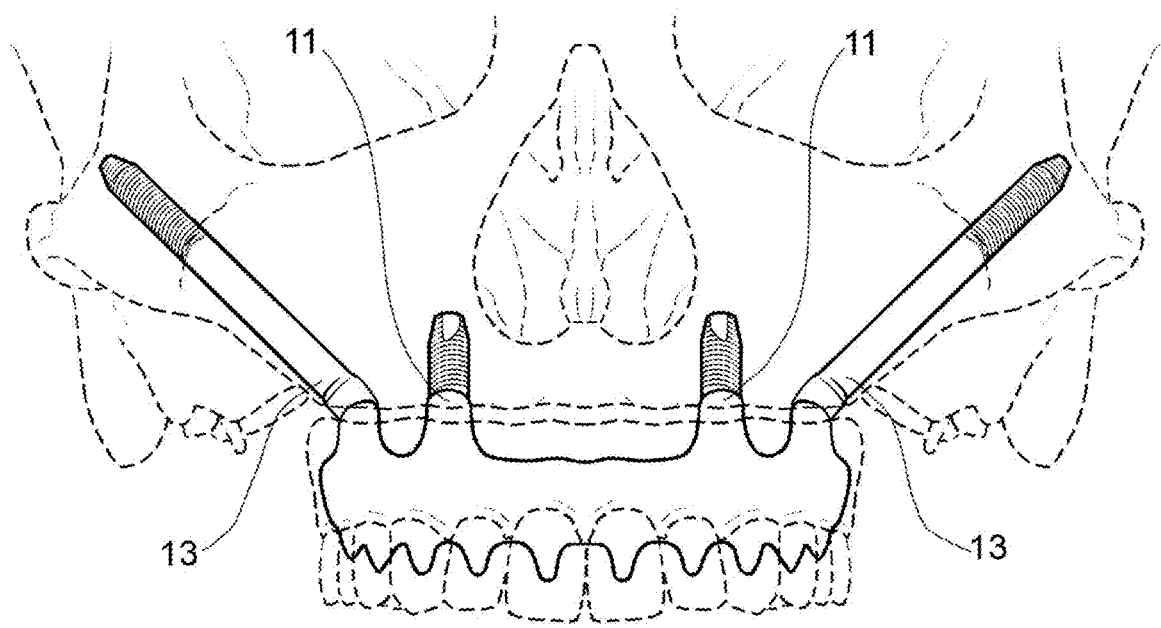
FIG. 1A (already described) is a frontal view of a dental bridge supported by two conventional dental implants and two zygomatic implants belonging to the prior art, FIG. 1B (already described) is an occlusal view of a bridge supported by two conventional dental implants and two zygomatic implants belonging to the prior art, FIG. 2A (already described) is a perspective view of a first zygomatic implant belonging to the prior art, FIG. 2B (already described) is a perspective view of an angled frustoconical abutment to be connected to the coronal end of the zygomatic implant in FIG. 2A, FIG. 3A (already described) is a perspective view of a second zygomatic implant belonging to the prior art, FIG. 3B (already described) is a perspective view of an angled frustoconical abutment to be connected to the coronal end of the zygomatic implant in FIG. 3A.
Figure 1B:
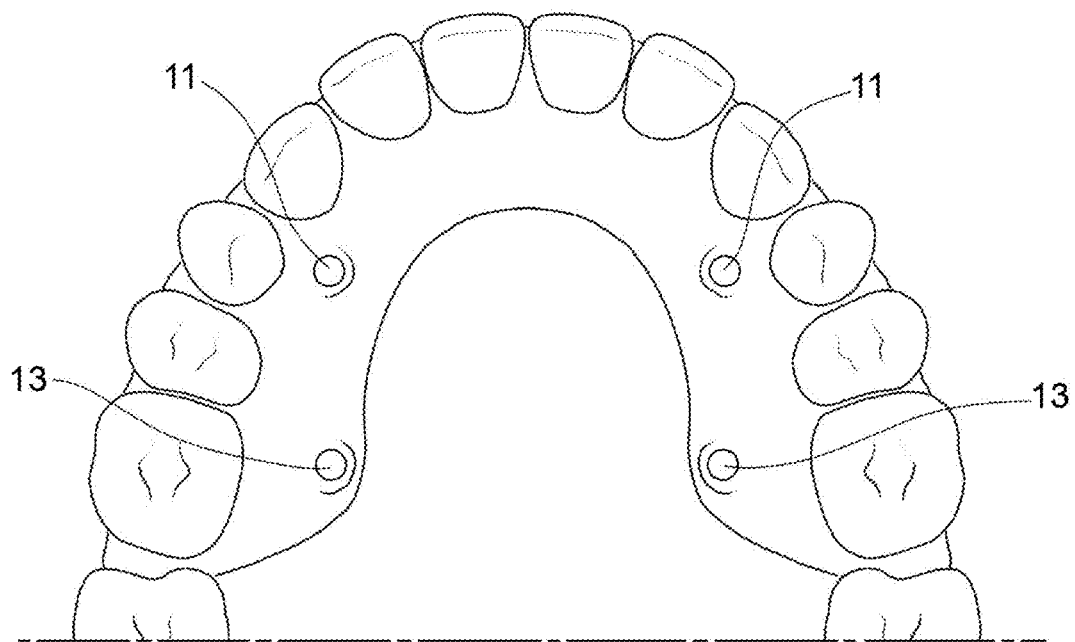
Figure 4:
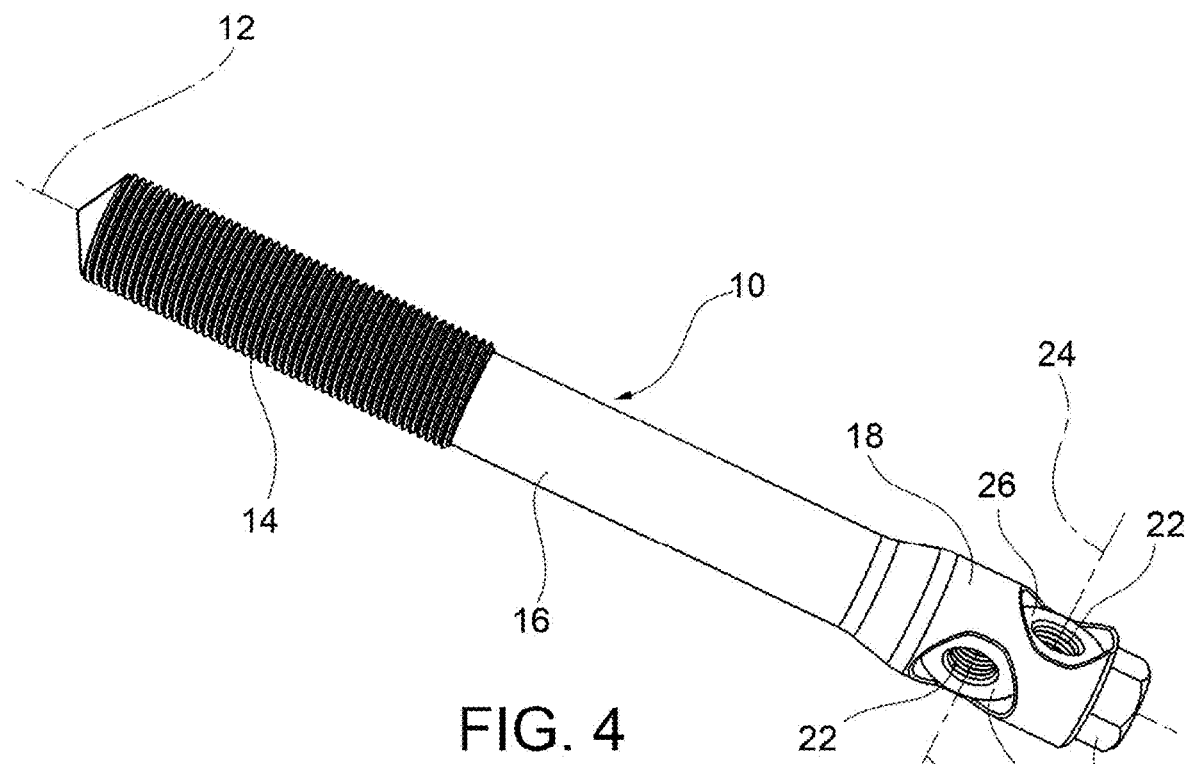
FIG. 4 is a perspective view of a zygomatic implant according to the present invention.
Figure 5:
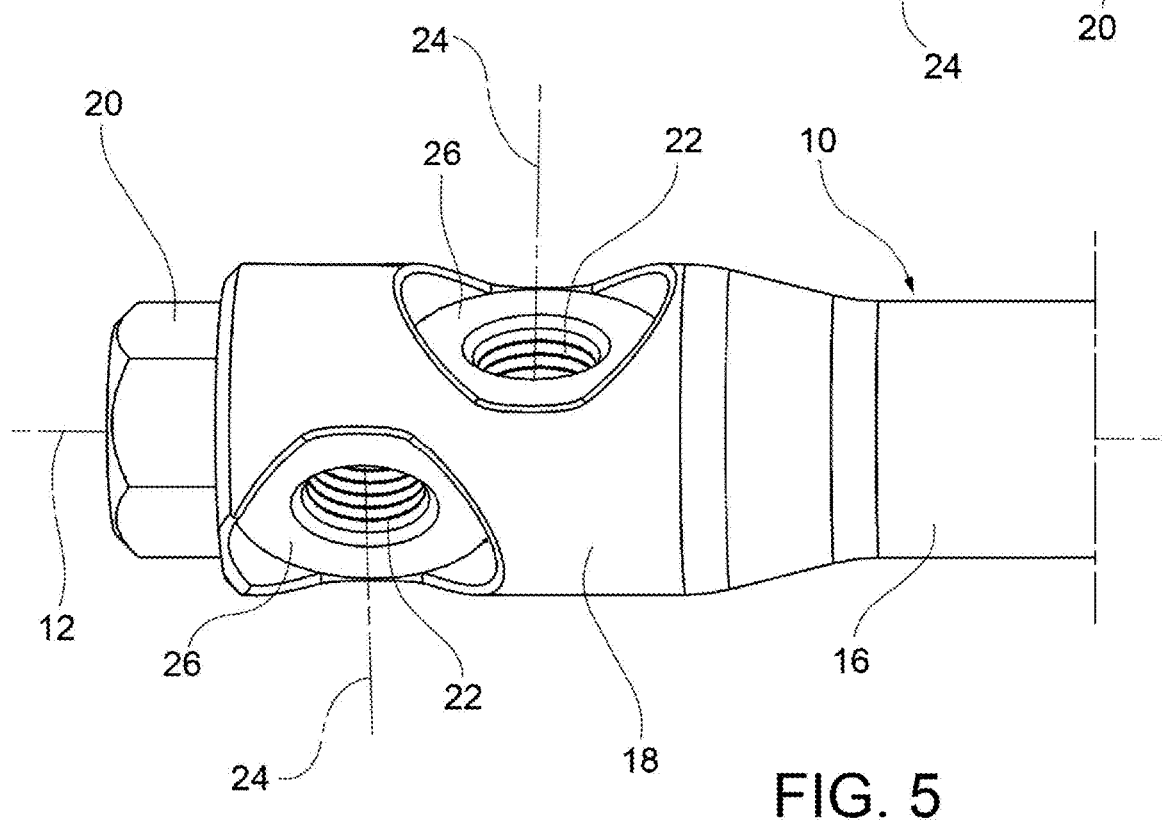
FIG. 5 is an enlarged scale view of the coronal end of the zygomatic implant in FIG. 4.

A zygomatic implant for supporting a dental bridge comprises (FIGS. 4 and 5) a stem 10 having a longitudinal axis 12 and comprising a threaded apical portion 14, an intermediate portion 16, and a neck portion 18, and a head 20 with a polygonal cross section, in particular a hexagonal cross section, that protrudes atop the neck portion 18. As mentioned above, the combination of the intermediate portion 16 and the neck portion 18 of the stem 10 is called coronal portion.

Two blind internal threads 22 are made through the lateral surface of the neck portion 18, each of which has an axis 24 orthogonal to the longitudinal axis 12 and a mouth located on a side wall of the stem 10. The mouth of each internal thread 22 is surrounded by a flat crown 26 indented with respect to the lateral surface of the neck portion 18.

The two internal threads 22 are arranged longitudinally offset along the axis 12 of the stem 10, i.e., at different elevations, and their axes 24 are circumferentially offset by an angle of between 115° and 125°, preferably 120°.

The neck portion 18 has an enlarged cross section with respect to the circular cross section of the intermediate portion 16 and the apical portion 14.

The coronal portion 16, 18 as a whole has a length that exceeds or is equal to the length of the apical portion 14. In the use of the zygomatic implant, the intermediate portion 16 extends laterally to the maxillary sinus of a patient and has a diameter of approximately 3.5 mm and a length of approximately 10 mm to approximately 30 mm. The neck portion 18 is positioned in the use of the zygomatic implant in the residual alveolar bone of the patient and has a diameter of approximately 4.5 mm and a length of approximately 7 mm.

The head 20 having a hexagonal cross section allows the zygomatic implant to be screwed in and is advantageously 1.5 mm high and has a transverse dimension of 3.0 mm.

Preferably, the zygomatic implant is monolithic, but, in embodiments not illustrated, it may consist of multiple parts assembled together.

Figure 8:
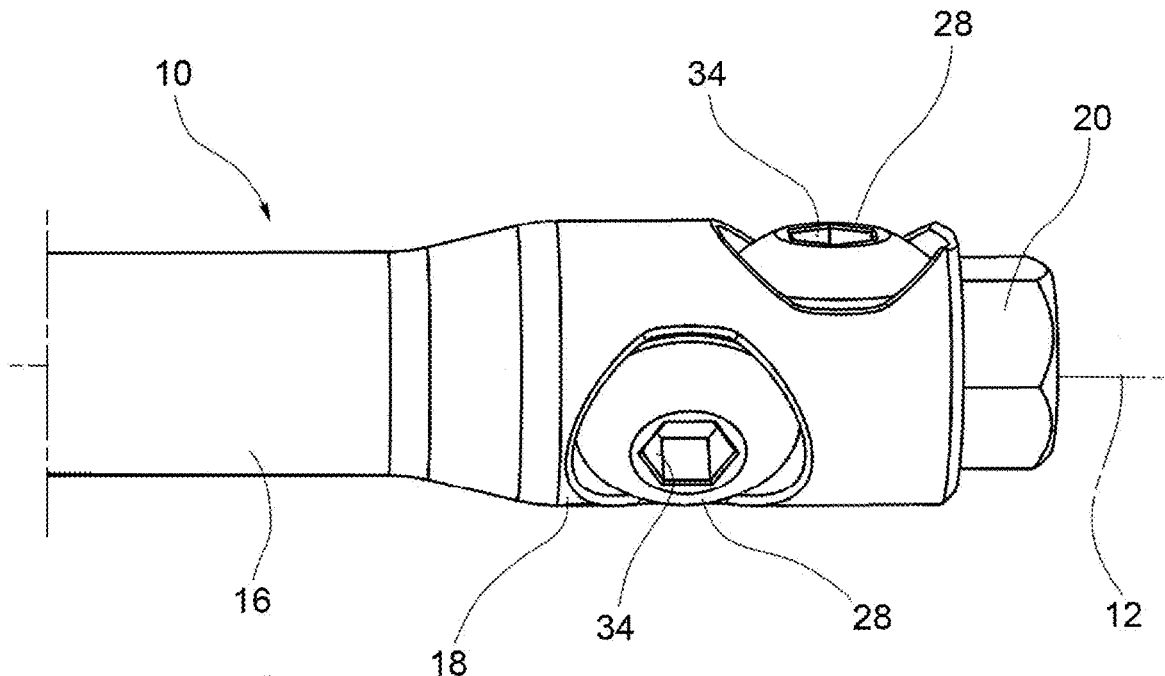
FIG. 8 is a perspective view corresponding to FIG. 5 with the covers in FIGS. 6A and 6B screwed into the internal threads of the invention.

Prior to use, the internal threads 22 are closed by a respective cover screw 28 (FIGS. 6A and 6B) shaped like a mushroom with a threaded stem 30 which is screwed (FIG. 8) into the respective threaded cavity 22 of the stem 10, and a head 32 within which a maneuvering cavity 34 is formed.

FIGS. 7A and 7B illustrate a straight frustoconical abutment 36 suitable for being screwed into one of the threaded cavities 22. The abutment 36 has a rectilinear axis 38 and comprises a threaded shank 40, a body 42, and a head 44 with polygonal cross section, within which an internal thread 46 is made extending along the rectilinear axis 38.

The body 42 of the abutment 36 has a cylindrical portion 48 from which the threaded shank 40 departs, a frustoconical intermediate portion 50, and a frustoconical end portion 52 from which the head 44 departs.

The frustoconical portions 50 and 52 have opposite tapering and, advantageously, the frustoconical end portion 52 has a side wall inclined at an angle of between 40° and 50°, preferably 45°, with respect to the rectilinear axis 38 of the abutment 36.

To place the above-described implant, first the distal portion of the apical threaded portion 14 of the stem 10 is screwed into the zygomatic bone of a patient, following an osteotomy procedure.

Figure 9:
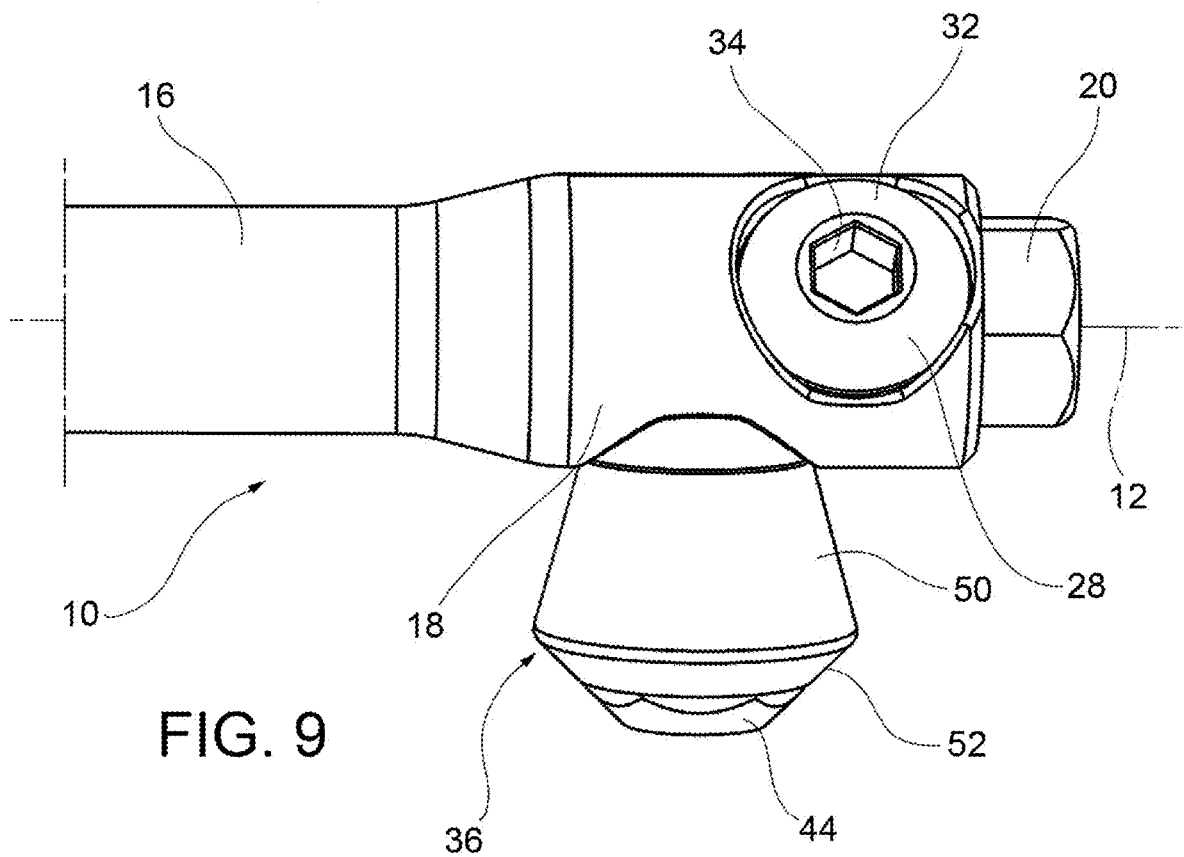
FIG. 9 is a perspective view corresponding to FIG. 5 with a cover of FIGS. 6A and 6B and an abutment of FIGS. 7A and 7B screwed into respective internal threads of the zygomatic implant of the present invention.
Figure 10A:
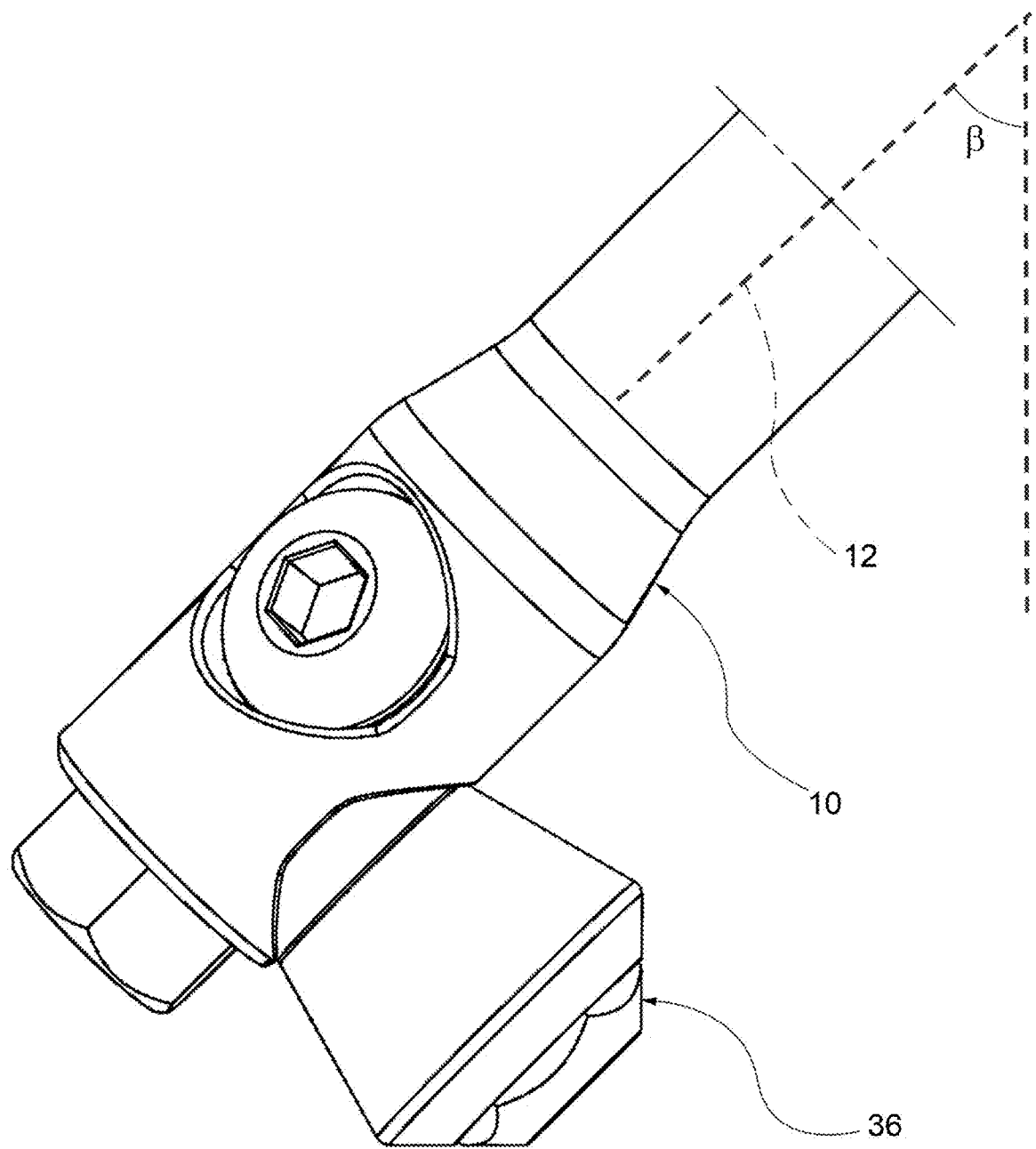
FIG. 10a is a perspective view illustrating the zygomatic implant of the present invention positioned "off-axis in the frontal plane" at an angle β of approximately 45°.
Figure 10B:
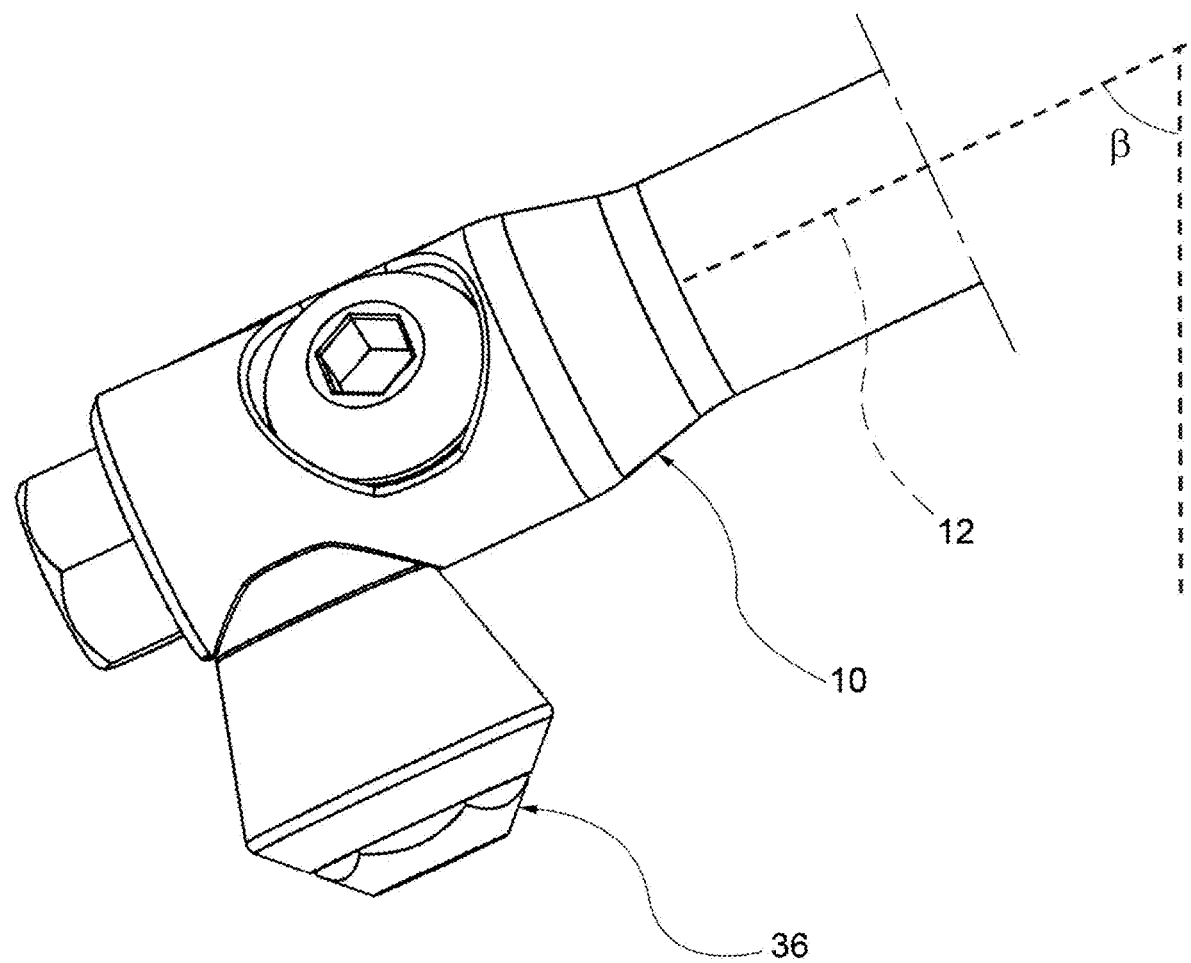
FIG. 10b is a perspective view illustrating the zygomatic implant of the present invention positioned "off-axis in the frontal plane" at an angle β of approximately 65°.

Then, the cover screw 28 is removed from that of the two threaded cavities 22 which, following the screwing of the implant into the zygomatic bone, is oriented in the most favorable way and the threaded shank 40 of the abutment 36 bearing a dental bridge (known per se and not illustrated) is screwed therein (FIG. 9) until the lower surface of the cylindrical portion 48 of the abutment 36 is in contact with the flat crown 26 surrounding the mouth of the threaded cavity 22. It goes without saying that the orientation of the abutment 36 depends on the rotational position of the stem 10 which determines the orientation of the threaded cavity 22 when the abutment 36 is screwed therein. Therefore, care must be taken to ensure that the zygomatic implant is screwed into a defined position toward an ideal occlusal plane.

Finally, screwing the apical threaded portion 14 of the stem 10 into the zygomatic bone is completed, taking care to ensure that, when the screwing is finished, the abutment 36 is oriented toward the occlusal aspect.

When the screwing is completed, the neck portion 18 of the stem 10 rests on the alveolar ridge of the maxilla, thereby providing secondary bone support to the occlusal load, while the apical threaded portion 14 provides the primary bone support.

The possibility of choosing between two threaded cavities 22 provides greater operative flexibility aimed at achieving an anatomically correct position of the abutment 36 with respect to the alveolar ridge of the maxilla. As a result, placement of the abutment 36 is facilitated with a shorter surgical time, while also allowing for reliable anchorage to the alveolar ridge of the maxilla.

The zygomatic implant of the present invention has the advantages of being reliably anchored within the maxilla and allowing a connection of the abutment 36 that is vertically oriented with the alveolar ridge of the maxilla.

As mentioned above, further advantages are due to the possibility of choosing into which of the two internal threads 22 to screw the abutment 36. In effect, due to this option, there is greater surgical positional flexibility, bending stresses exerted on the implant are reduced, more space is provided for the patient's tongue (since the bridge is less bulky in the palate), and a more aligned load transfer with respect to the screw-retained bridge is allowed.

An advantage provided by the head 20 having a polygonal cross section is that of increasing visibility during installation of the implant.

Of course, without prejudice to the principle of the invention, the details of implementation and the embodiments may vary widely with respect to that which has been described purely by way of example, without thereby departing from the scope of the invention as described and claimed herein.

What is claimed is:

1. An implant system for supporting a dental bridge, comprising a zygomatic implant and an abutment; the zygomatic implant comprising:
   a stem having a longitudinal axis and comprising a threaded apical portion, an intermediate portion, and a neck portion, and
   a head having a polygonal cross section that protrudes atop the neck portion,
   wherein said neck portion comprises at least two internal threads configured for attachment of the abutment, each internal thread having an axis orthogonal to the longitudinal axis of the stem and a mouth located on a lateral wall of the stem, said at least two internal threads being arranged to longitudinally offset along the longitudinal axis of the stem.

* * * * *